(No Model.) 2 Sheets—Sheet 1.

W. H. DAVIS.
CORN PLANTER AND FERTILIZER DISTRIBUTER.

No. 455,682. Patented July 7, 1891.

Witnesses
H. G. Dieterich
Wm. Bagger

Inventor
William H. Davis,
By his Attorneys,
C. A. Snow & Co.

(No Model.) 2 Sheets—Sheet 2.
W. H. DAVIS.
CORN PLANTER AND FERTILIZER DISTRIBUTER.
No. 455,682. Patented July 7, 1891.
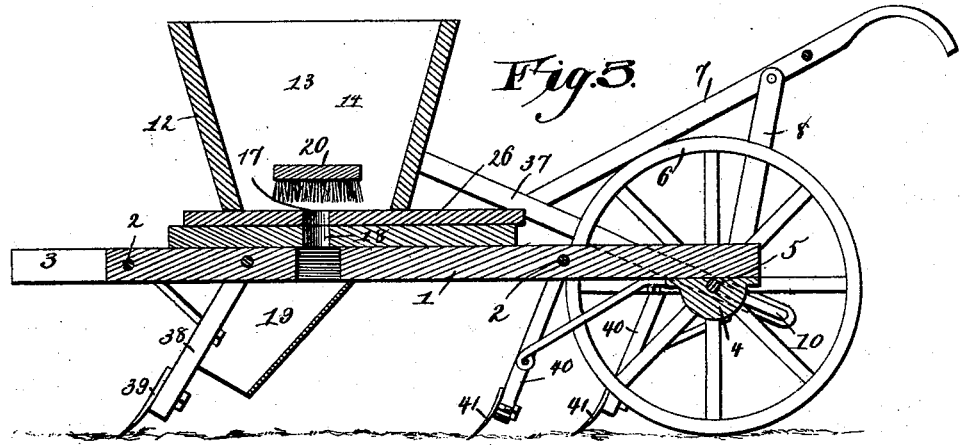
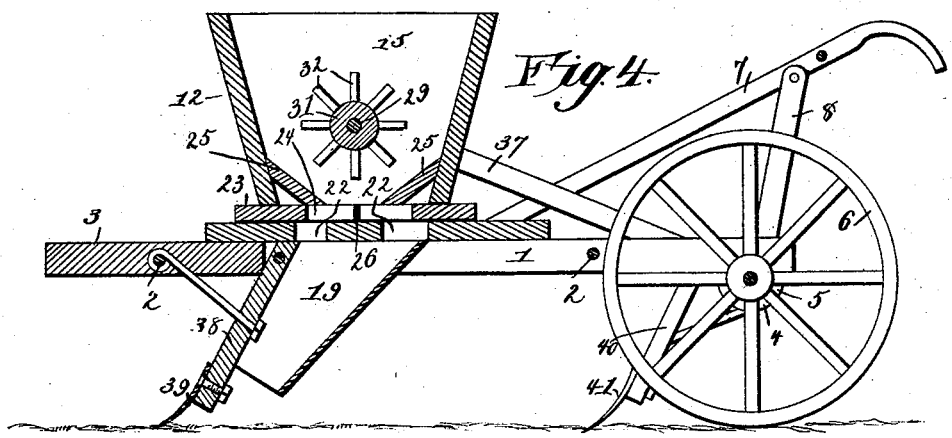
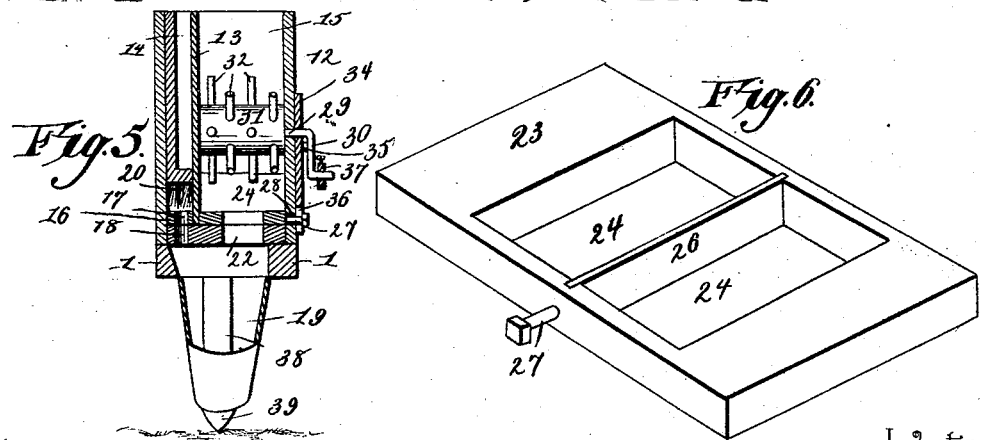
Witnesses
H. G. Dieterich
Wm. Bagger
Inventor
William H. Davis
By his Attorneys,
C. A. Snow & Co.

UNITED STATES PATENT OFFICE.

WILLIAM HAYWOOD DAVIS, OF CHAPEL HILL, TEXAS, ASSIGNOR OF ONE-HALF TO R. L. ADAMS, OF SAME PLACE.

CORN-PLANTER AND FERTILIZER-DISTRIBUTER.

SPECIFICATION forming part of Letters Patent No. 455,682, dated July 7, 1891.

Application filed November 11, 1890. Serial No. 371,070. (No model.)

*To all whom it may concern:*

Be it known that I, WILLIAM HAYWOOD DAVIS, a citizen of the United States, residing at Chapel Hill, in the county of Washington and State of Texas, have invented a new and useful Corn-Planter and Fertilizer-Distributer, of which the following is a specification.

This invention relates to combined planters and fertilizer-distributers; and it has for its object to construct a machine of this class which shall possess superior advantages in point of simplicity, durability, and general efficiency.

With these ends in view the invention consists in the improved construction, arrangement, and combination of parts, which will be hereinafter fully described, and particularly pointed out in the claims.

Figure 1:
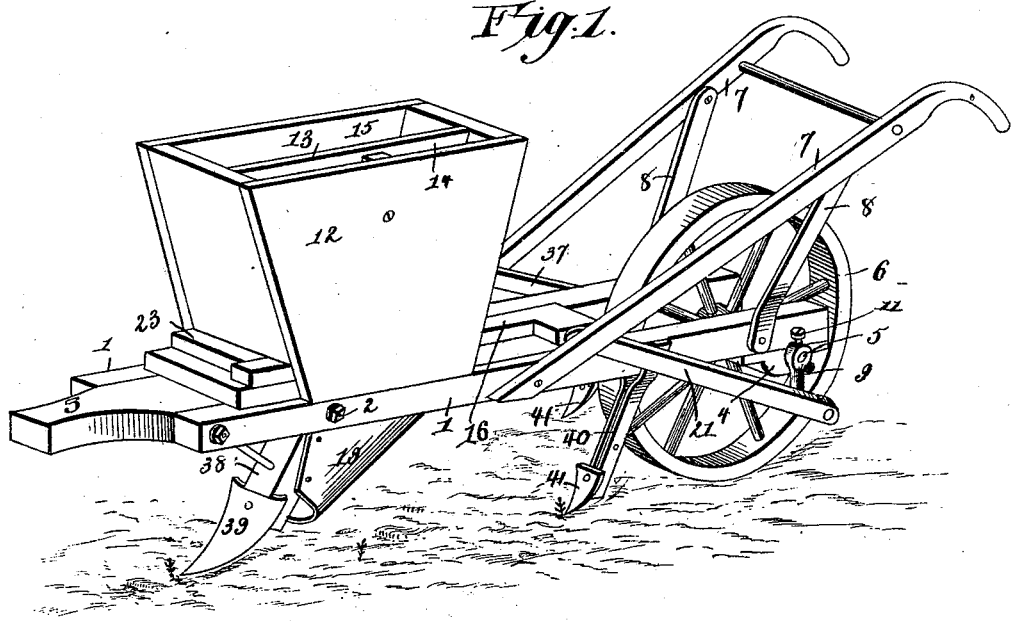
Figure 2:
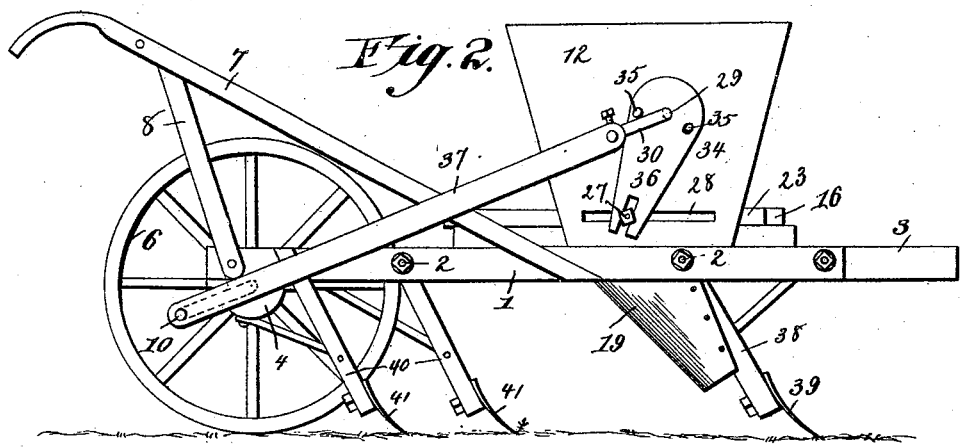

In the drawings hereto annexed, Figure 1 is a perspective view of a machine constructed in accordance with this invention. Fig. 2 is a side elevation. Fig. 3 is a vertical sectional view taken longitudinally through the corn-planting compartment of the hopper. Fig. 4 is a similar view taken longitudinally through the fertilizer-compartment. Fig. 5 is a transverse sectional view. Fig. 6 is a detail view of the fertilizer-distributing slide.

Like numerals of reference indicate like parts in all the figures.

The frame of my improved machine is composed of the side beams 1 1, connected by the cross-braces 2. The tongue 3 is suitably secured between the front ends of the side beams of the frame. The said side beams are provided near their rear ends with boxes or bearings 4 for the transverse shaft or axle 5, carrying the transporting and operating wheel 6. Handles 7, by means of which the machine may be guided in operation, are suitably secured to the frame and are connected with the rear ends of said side beams by means of braces 8. The shaft or axle 5 is provided at its ends with cranks 9 and 10, the former of which is mounted adjustably upon the said shaft by means of a set-screw 11. From these cranks motion is transmitted to the seed and fertilizer dropping mechanisms, which are contained in the hopper mounted upon the frame and the construction of which is as follows:

In the hopper, which is designated by 12 and which is suitably secured upon the side beams of the frame, is arranged a longitudinal partition 13, whereby it is divided into compartments 14 and 15, adapted, respectively, to receive the corn and the fertilizing material. In the bottom of the seed-compartment 14 is arranged a longitudinally-reciprocating slide 16, having a perforation or seed-cup 17, which may be of any suitable size. The bottom of the seed-compartment has an opening 18 registering with the seed-spout 19, which extends downwardly from the frame. Arranged vertically in the seed-compartment 14, directly above the bottom opening 18, is a cut-off brush 20 of ordinary construction, which serves to remove superfluous seed from the seed-cup 17 of the slide. The latter is connected by a pitman 21 with the crank 9, which is mounted adjustably upon the shaft 5 of the machine and from which motion is thus transmitted to the seed-slide. The bottom of the fertilizer-compartment 15 is provided with two openings 22 22, and above the said bottom is mounted a reciprocating slide 23, having an opening 24, which communicates with the compartment 15. The latter is provided with inclined plates 25 to guide the contents of said compartments into the opening 24 of the slide 23. The said opening has a central transverse plate or partition 26, from which a bolt or pin 27 extends outwardly through a horizontal slot 28 in the side of the hopper. Both of the openings 22 communicate with the seed-spout 19. Suitably mounted transversely in the compartment 15 is a shaft 29, the outer end of which has a crank 30. The shaft 29 carries a drum 31, which is provided with radially-extending fingers or agitators 32, adapted to stir the contents of the compartment 15 and cause it to enter the opening 24 in the slide 23. Loosely mounted upon the projecting end of the shaft 29 is a plate 34, provided with pins or studs 35, adapted to be alternately engaged by the crank 30 of the rock-shaft 29, thus causing the plate 34 to vibrate. The lower end of the plate 34 has a slot 36, engaging the pin or bolt 27, that projects from the partition 26 in the slide 23. The crank 29 is connected by a pitman or connecting-rod 37 with the crank 10 upon the shaft 5, that carries the operating-wheel.

The frame of the machine is provided at its front end with a standard 38, carrying a furrow-opener 39. The side beams of said frame are provided near their rear ends with standards 40, carrying the coverers 41.

The operation of my invention will be readily understood from the foregoing description, taken in connection with the drawings hereto annexed. The seed is placed in the compartment 14 and the fertilizing material in the compartment 15 of the hopper. By properly adjusting the crank 9 upon the shaft or axle 5 the seed-slide 16 may be operated so as to drop the seed slightly in advance or in rear of the fertilizing material, or the adjustment may be made in such a manner as to cause the fertilizing material to be dropped either below or above the seed, as may be preferred. The operation of the seed-slide is obvious, the cup in the slide serving to carry the seed under the brush or cut-off and drop it through the perforation 18, which communicates with the seed-spout 19. To the rock-shaft 29 an oscillating motion is imparted by the pitman 37 from the shaft or axle 5. The fingers 32 upon said rock-shaft will cause the contents of the compartment 15 to enter the opening 24 in the slide 23 alternately on opposite sides of the partition 26. As the rock-shaft vibrates, the crank 30 will strike against the studs 35 alternately on opposite sides of the pivoting-point of the plate or lever 34, thus vibrating the latter and causing it to impart to the slide 23 a rapid reciprocating motion, whereby the portion of the compartment 24 on opposite sides of the partition 26 will be caused to register with the openings 22 alternately, thus causing the fertilizing material to be discharged into the seed-spout 19. The quantity of fertilizing material dropped at each operation will be governed by the size of the opening in the slide 23. It will also be seen that, owing to the sudden and rapid movement of the slide 23, the fertilizing material will not be given a chance to clog the slide, but will be shaken out by the suddenness of the movement of the latter.

Having described my invention, what I claim, and desire to secure by Letters Patent of the United States, is—

1. In a seed-planter and fertilizer-distributer, the combination of the frame, the hopper having a longitudinal vertical partition, a rock-shaft mounted in one of the compartments of the hopper and having a drum provided with radially-extending fingers and a crank formed at its outer end, a slide mounted to reciprocate in the bottom of said hopper, a plate or lever mounted loosely upon the projecting ends of the rock-shaft and having pins or studs adapted to be alternately engaged by the crank, a pin or bolt extending from the reciprocating slide and engaging a slot in the free end of the plate or lever, and mechanism for transmitting an oscillating motion to the rock-shaft from the axle of the machine, substantially as and for the purpose set forth.

2. The combination of the hopper, the rock-shaft mounted transversely in the same, the slide arranged to reciprocate longitudinally in the hopper and having an opening provided with the central transverse partition, a pin or bolt extending from the latter through a slot in the side of the hopper, a plate or lever mounted loosely upon the rock-shaft and having a slot engaging the said pin or bolt, mechanism for causing said plate or lever to be vibrated by the oscillating movement of the rock-shaft, and mechanism for transmitting motion to the latter from the axle of the machine, substantially as set forth.

3. The combination of the hopper, the bottom of which is provided with two openings communicating with the seed-spout, the reciprocating slide having an opening provided with a central partition, the rock-shaft, and a plate or lever mounted upon and vibrated by the latter and connected loosely with the reciprocating slide, substantially as and for the purpose set forth.

4. The combination of the hopper, the bottom of which is provided with two openings connected with the seed-spout, the reciprocating slide having a single opening provided with a transverse partition, a pin or bolt extending from said partition through a longitudinal slot in the side of the hopper, the rock-shaft mounted in the latter and having a crank at its upper end, a plate or lever mounted loosely upon said rock-shaft and having a slot at its free end engaging the pin or bolt extending from the slide, the pins or studs upon said plate or lever adapted to be alternately engaged by the crank of the rock-shaft, and a pitman or connecting-rod connecting said crank with a crank upon the shaft or axle of the machine, substantially as and for the purpose herein set forth.

In testimony that I claim the foregoing as my own I have hereto affixed my signature in presence of two witnesses.

WILLIAM HAYWOOD DAVIS.

Witnesses:
 JOHN W. GOODE,
 L. L. PROUTY.